United States Patent [19]
Seraphim et al.

[11] Patent Number: 5,889,568
[45] Date of Patent: Mar. 30, 1999

[54] TILED FLAT PANEL DISPLAYS

[75] Inventors: Donald P. Seraphim, Vestal; Che-yu Li; J. Peter Krusius, both of Ithaca, all of N.Y.

[73] Assignee: Rainbow Displays Inc., Endicott, N.Y.

[21] Appl. No.: 571,208

[22] Filed: Dec. 12, 1995

[51] Int. Cl.⁶ .............................. G02F 1/133; G02F 1/345
[52] U.S. Cl. ................................ 349/73; 349/149; 349/1; 349/76; 349/903
[58] Field of Search .................................. 345/1, 76, 903; 349/73, 149

[56] References Cited

U.S. PATENT DOCUMENTS

| 5,497,258 | 3/1996 | Ju et al. | 349/149 |
| 5,557,436 | 9/1996 | Blose et al. | 349/149 |

FOREIGN PATENT DOCUMENTS

| 3-192333 | 8/1991 | Japan | 349/149 |

OTHER PUBLICATIONS

Edmondson, G. Et al, The Grand Alliance in Flat Panels, Science & Technology, Business Week/Aug. 28, 1995, 2 pages.

Mazurek, N, et al, P–47:A 51–in.–Diagonal Tiled LCD VGA Monitor, Magnascreen Corporation, Horsham, PA, 7 pages.

*Primary Examiner*—William L. Sikes
*Assistant Examiner*—Julie Ngo
*Attorney, Agent, or Firm*—Salzman & Levy

[57] ABSTRACT

A large flat panel display having a plurality of tile display modules with capability in the range of 12 or more lines per inch, being precisely manufactured and aligned such that the interpixel spacing between two adjacent tiles maintains the uniformly periodic spacing of the interpixel spacing within tiles. The display is addressed as a single monolithic display, without reference to the plurality of individual tiles making up the display. All of the interconnections between tiles are located between tiles in the "shadow area", unless all tiles can have an edge around the periphery of the display. Also disclosed are methods of making and assembling the tiles and the displays.

76 Claims, 9 Drawing Sheets

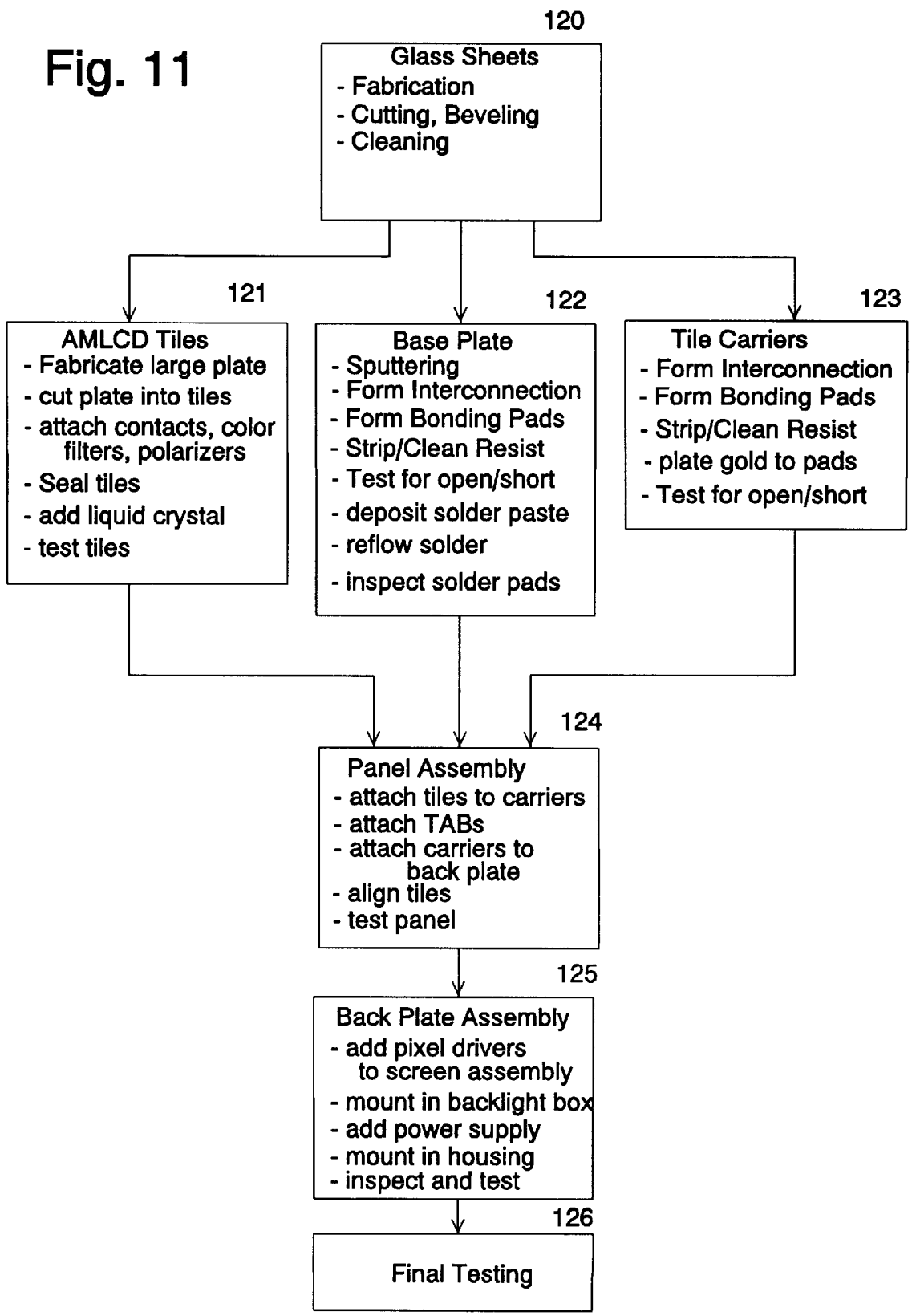

TILED FLAT PANEL DISPLAYS

FIELD OF THE INVENTION

The invention pertains to the field of flat panel displays. More particularly, the invention pertains to large, monolithically addressed, flat panel displays made up of a plurality of smaller display "tiles" with capability in the range of 12 or more lines per inch.

BACKGROUND OF THE INVENTION

The ultimate television set will hang on the living room wall like a picture, and be at most a few inches thick. The most promising technology in this field today is the liquid crystal display (LCD). Liquid crystal displays have been commercially available for more than 20 years, but until recently have been restricted to relatively small size. Such displays are ubiquitous in watches, calculators, radios, and other products requiring indicators and some small number of alphanumeric characters. Recently, improvements in liquid crystal technology has occurred, allowing larger high line density displays to be manufactured. These have achieved widespread acceptance in portable computers, very light laptop computers, and dedicated word processors. Other products include flat screen and projection television systems. Additional improvements in the technology have led to full color displays, which are now in production.

The original LCD technology, commonly used in watches and calculators and the like, was termed "passive matrix". Row and column lines were energized to activate a specific LCD spot (picture element or "pixel") at the intersection of the row and column. The display was continually scanned to turn each pixel on or off as needed.

The more modern technique, currently used in most laptops, includes the addition of active switches to control the action of the liquid crystal at each picture element or pixel. The active switch can be a thin film diode or a thin film transistor, and, for large displays, the number of active elements approaches the number of transistors in a dynamic memory chip. These displays are termed "Active Matrix Liquid Crystal Displays", or "AMLCD". The result is higher speed, higher contrast, and higher overall brightness. The use of these active devices to control "light valves" greatly simplifies the electronics of the display, but the cost of these improvements is the added fabrication sequence to deposit the active devices at each pixel, and the need for leads to each device, a total of hundreds of thousands of devices for each display.

The keys to the economical production of AMLCD are the yield of the complex sequential process and the number of displays that may be cut from a panel.

A common problem in the manufacture of large area panel displays is that of a relatively low yield. This is usually expressed in defects per unit area—for example, 0.01 defects/$cm^2$ corresponds approximately with 1993 manufacturing practice in Japan (see *Liquid Crystal Flat Panel Displays*, William C. O'Mara, 1993, p. 105). At this defect level, the yield for a 10" diagonal display, common in laptop computers, is about 90% at best, which results in a cost of $500–$1,000 per display. The larger the display, the lower the yield, using conventional technology. If a 10" display has a yield of 80%, a 35" display (approximately 12 times larger in area) would have a yield of $0.8^{12}$, or 6%, or six good displays out of one hundred, without rework or repair. Large-screen TVs of 25–35" diagonal would not be economical with such a yield rate and current production methods. First generation panels are currently available up to about 17" in size. Second generation panels, expected by about 1996, will be up to around 21", while third generation panels, some 5–10 years in the future, may be expected to be as much as 29".

To reach larger sizes where monolithics are not economical due to the problems discussed above, a plurality of relatively small "tile" displays can be connected together in precise alignment to form the larger display, one suitable alignment technique being described in copending U.S. patent application Ser. No. 08/297,958, filed Aug. 31, 1994. Sharp, a Japanese display manufacturer, has recently announced a tiling product which fails to meet the requirement of uniformly periodic pixel spacing. In tiled displays, each of the tiles may be individually tested before assembly, and defective tiles discarded. The yield loss is then due only to the assembly operations and factors relating to system performance specifications. Furthermore, the assembly may be designed to be reworkable by removal and replacement of tiles.

The present invention relates, in general, to a method for making these tiled displays for use in large area panel displays, and more particularly to a technique for producing and assembling such small display tiles into a large area display and selectively electrically interconnecting the tiles while at the same time mechanically positioning them to meet the desired optical specifications.

This disclosure describes a unique approach to the design and fabrication of flat panel displays through the utilization of innovative interconnection designs and assembly technology, some of which are adapted from state of the art assembly of semiconductors and enhanced to account for optical as well as electronic specifications.

In AMLCD flat panel displays that are lighted from the back, all pixel locations must be spaced center to center with a uniform periodicity, and lighting intensity must be uniform. In addition, the solid angle of light being emitted from each pixel should be large and uniform. Moreover, the electrical lines for each pixel cannot obstruct the light-transmitting part of the light valve (the switchable section of the LCD display which actually forms the pixel).

These specifications are all new to display technology, requiring careful design and technology improvements to handle precise locations of the pixels and to achieve continuity in observed pixel spacing from tile to tile.

New packaging designs and processes to enhance tiling capability described herein will allow displays to be made that are much larger than monolithic displays.

Within a tile, maintaining the interpixel spacing and routing the electrical connections is a function of the monolithic fabrication process, but at the perimeter the tile must be connected to neighboring tiles. In semiconductor manufacturing, this edge space (known as a "kerf" area) is generally wasted to accommodate bonding sites and room for cutting. In tiled optical displays, however, neighboring pixels on neighboring tiles must appear to the eye to be the same size as all others and must have uniformly periodic spacing within each tile, and across the tile boundaries. There is little room for a kerf.

SUMMARY OF THE INVENTION

In accordance with the present invention, the manufacturing yield for large area high line density flat panel displays is significantly improved by utilizing a large number of small area displays mounted on a common substrate and electrically interconnected to replicate the function of a large area display. The entire display is "monolithically addressed"—that is, treated as if it were a single monolithic display, rather than made up of smaller tile subunits. In a preferred embodiment, area array solder joints are used to mechanically align and assemble a multiplicity of small area display elements, or tiles, into a large display, with the solder joints also serving to provide electrical interconnections. In another preferred embodiment the solder joints are replaced by interconnections made of conductive adhesive. For tiled displays where all tiles can have an edge on the perimeter of the display (i.e. there are no "inside" tiles), adhesive assembly may be preferred, the tiles being addressed through the perimeter of the display. For backlit applications, the necessary interconnections within a tile and across tiles are maintained in the spaces between light valve elements so as not to obstruct light transmission through the light valve.

The most difficult problem addressed by the invention is along the edges of the tiles. At the intersections of the tiles, the edge dimensions of the tiles must be maintained such that the interpixel spacing remains uniformly periodic and minimized from tile to tile as well as within a tile. The tile perimeter design elements which must be incorporated into the dark interpixel space include a) the two seals on neighbor tiles; b) the contact pads for the lead frame type connections (if they are located outside the seal); c) the lead frame thickness between the walls of the two tiles; d) the spacing between tiles to allow for extraction of a tile without touching its neighbor tile(s); e) glass cutting tolerances; and f) location tolerances. All of these are within a dark space, and will set the width of the interpixel spacing, which must be minimized to maintain the light efficiency through the ratio of valve area to pixel area.

BRIEF DESCRIPTION OF THE DRAWING

FIG. 11 shows a flowchart of the method of fabrication of the tiled AMLCD of the invention.

FIG. 13 shows a side cut-away view of the embodiment of FIG. 12a–c along the line 13—13 in FIG. 12a.

DESCRIPTION OF THE INVENTION

While the tiled flat-panel displays of the invention will be shown and described herein as AMLCD displays, it will be understood that the teachings of the invention may also be embodied in other varieties of tiled displays, such as field emission, electroluminescent, gas-discharge, or other technologies yet to be developed. The matrix method of addressing the pixels described is preferred for the reasons given, but the invention is not restricted to any particular addressing scheme. Direct pixel addressing, pipelining, or other methods are equally applicable.

Figure 1:
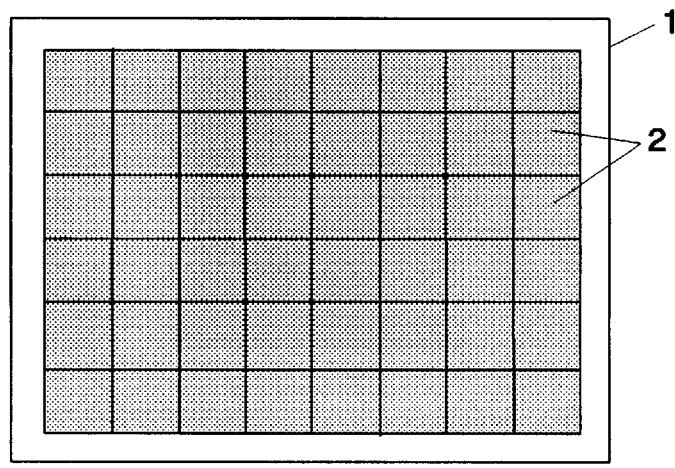
FIG. 1 shows a front view of a simplified tiled display constructed according to the teachings of the invention.

FIG. 1 shows a front view of a large flat-screen display constructed according to the teachings of the invention. For the purposes of this figure, the display is shown as it might be constructed for a wide-screen TV set having 525 lines vertically, each with 933 pixels horizontally. Such a display could be made up of an array of flat panel AMLCD tile modules (2), 8 wide by 6 high, mounted upon a backlit substrate or back plate (1). Each tile module would measure 4.6" (117 mm) wide by 3.46" (88 mm) high, which would result in an acceptable yield. Each tile module (2) will contain 117×88 pixels. To make an even division it is necessary to increase the total pixel count to 936×528.

The phrase "tile module" is used here to mean the smaller components from which the larger tiled display is constructed. These tile modules may be AMLCD tiles mounted on tile carriers, as described below. In an alternative, at some additional expense in tile fabrication, the tile modules could comprise just AMLCD tiles without the carrier, or small display elements of other sorts such as an electroluminescent (EL) displays, field emission displays (FED), Light Emitting Diodes (LED), plasma displays, or other technologies yet to be developed.

The number of necessary electrical connections per tile are, in a typical embodiment, 3×117 on one edge and 2×88 on the second edge. These connections must be made to every tile. Conventional printed circuit technology could be used for the back plate with one layer containing 8×3×117 circuit lines and another containing 6×2×88 circuit lines. One preferred embodiment disposes these circuit lines on a single sheet of glass with insulation between the two layers and vias joining the bottom layer to a surface layer.

Figure 2:
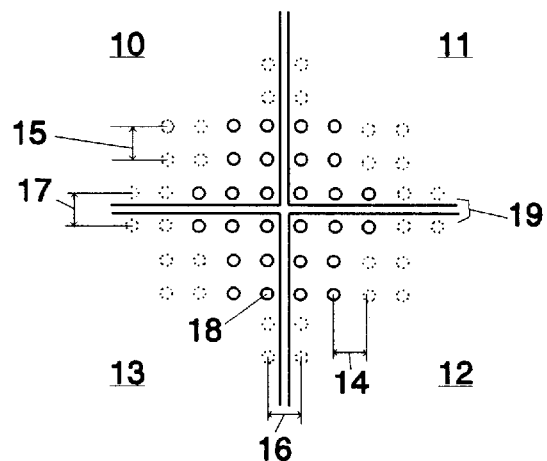
FIG. 2 shows a detail from FIG. 1, showing the intersection of four tiles.

As noted above, an important consideration which arises in tiling is the requirement of uniform periodicity of pixel spacing. This is shown in FIG. 2, which shows the intersection of four tiles (10)–(13). The pixels (18) on the edges of each tile must remain at the same spacing from the adjoining pixel on the next tile, both horizontally (16) and vertically (17) as it is from the adjoining pixel on the same tile (14) and (15), or the display will resemble a large TV wall made up of many smaller TV sets, with noticeable lines between each tile. One factor in maintaining the uniformity is the translational positioning accuracy of neighboring tiles (that is, aligning the tiles so that the intertile gaps (19) are small and even, and much less than the interpixel spacing); and a second factor, among others to be discussed below, is locating interconnections in the dark spaces on the edges of tiles.

Therefore, everything that might be in the kerf of a semiconductor chip should preferably reside inside the tile and between the edge pixels of neighboring AMLCD tiles.

Figure 3:
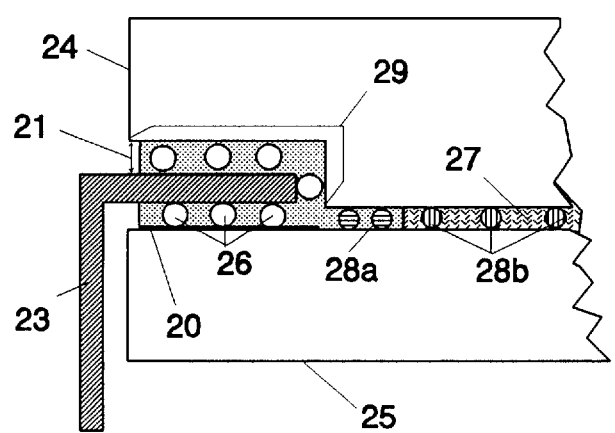
FIG. 3 shows a close-up perspective view of the edge of a tile.

As shown in FIG. 3, this requires that the interconnection pads (20) on the edge of the tile, the edge seal (21), the tolerances associated with glass cutting, and the lead-frame connection or Tape Automated Bond ("TAB") (23) that joins the tile to the interconnection scheme, must all exist between the edge pixels across two neighboring tiles. Included also is the seal on the neighboring tile and its glass cutting tolerance.

Overview of Design Criteria

In order to place the following detailed description of the invention in context, a review of the design criteria used to develop the preferred AMLCD embodiment is in order. The preferred embodiment comprises:

1) AMLCD tiles with new perimeter designs, including a narrow seal and precision cut edges of the glass. A color filter sheet is preferably included with the tiles, and one or two polarizer sheets is also to be included with the tiles.

2) Lead-frame type interconnections attached to pads on at least one perimeter ledge of the AMLCD tile. Several alternative designs for the attachment of the lead frame interconnections to the interconnection lands on the tile are described. The preferred lead-frame interconnection would be Tape Automated Bonding (TAB), but other lead-frame interconnections are possible as well.

3) A tile carrier with fine line metal interconnection on the bottom side, to which the open end of the TABs are attached through interconnecting pads on the carrier. Solder joint (or "C4") connections are used to mount the tile carrier and make the connections to a back plate. Alternatively, connections made of a conductive adhesive can be used instead of solder joint connections. The adhesive joining of the tile carrier to the tile is preferably applied in the dark areas in a grid with the same patterns as the interconnection and pixels and will have desired optical properties to help prevent side wall reflections.

4) Or, as an alternative to 3), using the bottom side of AMLCD tiles themselves (no carrier) in an identical design of interconnections.

5) A glass back plate to which all the tile modules are connected and which contains a full length of interconnections in one direction joining all tiles. Jumper connections on the back plate in the orthogonal direction form continuity of wiring in the orthogonal direction for interconnection on the bottom side of the tile carrier. The circuitized back plate will have a polarizer polymer sheet attached to the underside (although this is not the only possible position for the polarizer, depending on the design of the display).

The combination of numbers 1 to 5, above (including the monolithic interconnection within the tile) form the interconnection means for selectively actuating every pixel in the array of tiles as if it were a single monolithic display, rather than an array of tiles. The interconnections on the back plate connect to an external PCB which contains the driving circuits, color matching driver circuits and other necessary circuitry.

The interconnection designs on the bottom of the tile carriers or tiles and on the back plate repeat on the same grid as the pixels and are in the dark space outside the light valves within the pixel. The preferred design utilizes three lines in one direction and two orthogonally on the repetitive pixel grid to control the matrix of pixels (three light valves per pixel for full color).

The tile perimeter design elements include in the dark space a) the two seals (one on each of the neighboring tiles); b) the contact pads for the lead frame connections ; c) the lead frame thickness which is between the walls of the two tiles; d) the spacing between tiles to allow for extraction of the tile without touching the neighbor tile; and e) glass cutting tolerances and C4 (solder joint alignment) location tolerances. The same dark space will also be used to contain the design for the orifice for entry of the liquid crystal and a cut in the glass at the edge to contain epoxy for a final seal of the orifice. The tile perimeter or the dark spaces within a tile will contain the design of the conductive adhesive contacts for the grounding contacts to the AMLCD top conductive transparent ITO (Indium-Tin Oxide) layer.

One design for the glass top plate for the AMLCD contains an etched ledge deep enough to contain a thin TAB when the two monolithic plates are sealed together with 5–10 micron glass bead spacers. An alternative is to design the top plate of the AMLCD smaller than the bottom plate on at least one side leaving a ledge for joining the TAB to the monolithic lands.

A method of cutting the glass to separate the tiles from larger plates is presented, in which the plates are cut to form sides of the tile.

The display is lit from behind the back plate, and the lighting is diffused by a diffuser plate. The back plate should be optimized in the dark space areas to help prevent side wall reflections.

A transparent plate (glass or polymer) slightly smaller than the back plate with light shields blanking out all the area except for the light valve area preferably encloses the entire assembly. This is preferably sealed directly to the back plate or through a frame along the edges to provide environmental protection for the liquid crystal display modules and the interconnections. Other protection schemes could be used, as well.

Flat Panel Displays with fewer tiles, such as two tile, three tile and four tile can be modified from the general design to optimize them for denser pixel designs. Such designs can take advantage of the availability of perimeter connections of the tiled assembly to every tile to eliminate the need for interconnections across the tiles.

The preferred embodiments are currently achievable with state of the art techniques and equipment, and are generally intended to provide a low cost display with the lowest envisioned risk.

DETAILED DESCRIPTION OF PREFERRED EMBODIMENT

Tile Module Structure

Figure 7:
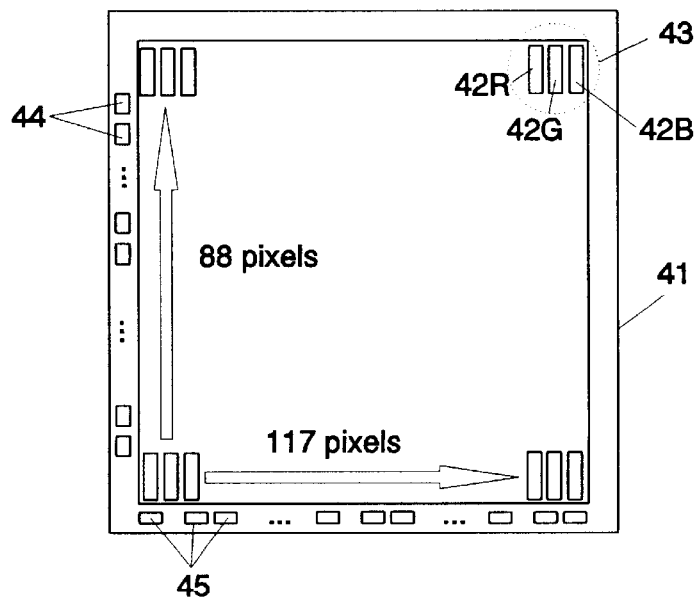
FIG. 7 shows a top view of a single tile display.

FIG. 7 shows the layout of a single tile (41). An array of three light valves, one for each primary light color—red (42R), green (42G), and blue (42B) makes up a single picture element (pixel) (43). For simplicity of drawing, the light valves (42) are shown only in the corners of the tile, but it will be understood that there are actually 10,296 pixels (30,888 light valves) on the tile, in an array of 117 pixels horizontally by 88 pixels vertically.

Figure 17:
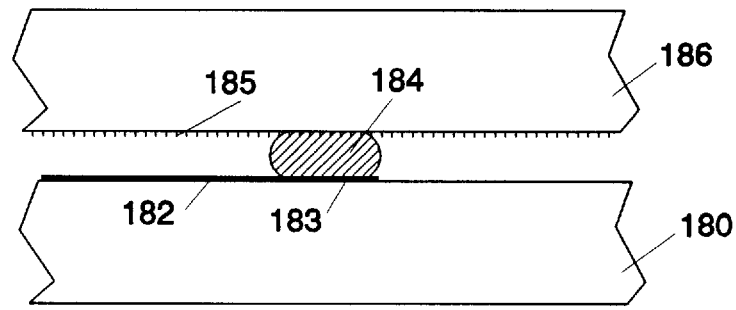
FIG. 17 shows a side cut-away view along lines 17—17 in FIG. 16.
Figure 18:
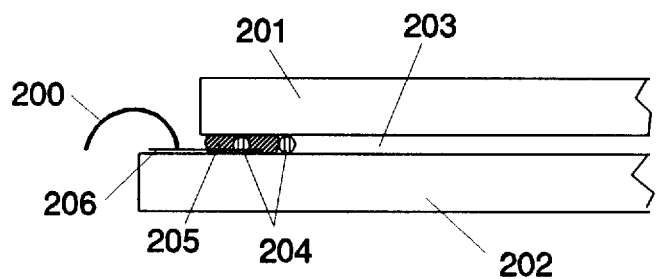
FIG. 18 shows a side view of an alternative ledge design to that of FIG. 3

As shown in FIGS. 17 and 18, the tile is made up of two transparent plates (180) and (186), preferably glass, with a liquid crystal material between (203). The lower side of the upper plate (186) is coated with ITO (Indium Tin Oxide) (185), a transparent conductive substance. The light valves are formed of isolated ITO pads on the upper surface of the lower plate, switched by transistors formed on the upper surface of the lower plate in the dark spaces between light valves.

The light valves are addressed using a matrix method, in that each light valve located at the intersection of a horizontal and vertical line may be controlled through appropriately powering the horizontal and vertical line. Each pixel requires five lines to control the pixel, in a matrix of 2 lines horizontal (ground and gate) and three lines vertical (red, green and blue). The horizontal and vertical lines are connected to pads (44) and (45) in FIG. 7, respectively. The use of the matrix addressing scheme, as is common to such displays, reduces the complexity of the drivers and interconnections from a system of directly addressing each of the tens of thousands of light valves in the display.

Figure 10:
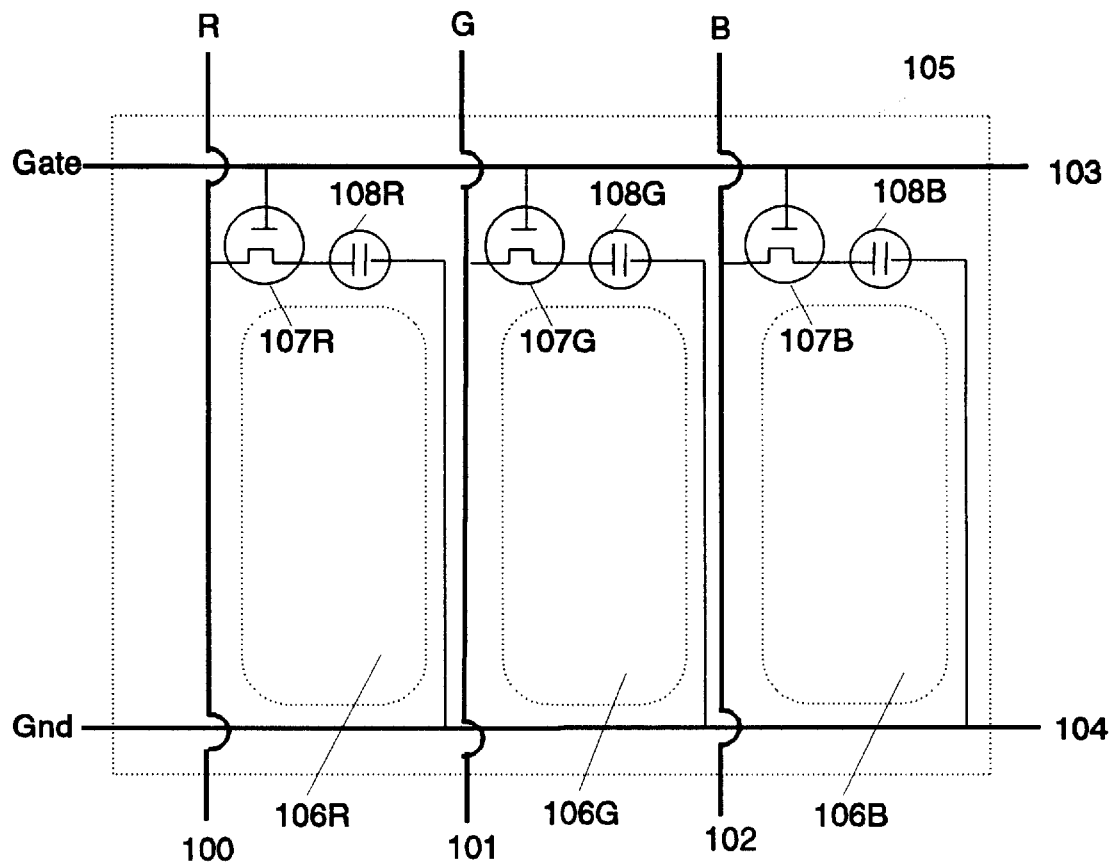
FIG. 10 shows a schematic diagram of a single pixel, showing the arrangement of the five lines to control the pixel.

The organization of the interconnection is matched to the perimeter design of the tiles. That is, one set of horizontal lines are connected to pads (44) located at one edge of the tile, and a second set runs orthogonally and is connected to pads (45) at the other edge. These sets are repeated for every pixel in an identical reference position. These interconnections will be located in dark areas for light transmission and will be shadow masked in the final assembly of the tiled AMLCD panel FIG. 10 shows a schematic diagram of a single pixel (105), which is made up of red, green and blue elements. The pixel is addressed by five lines from the matrix: a gate row line (103), a ground row line (104), and column lines for red (100), green (101) and blue (102). Each element is made up of an active switch (transistor) (107) and an LCD light valve (106). The element is controlled by turning on the gate line (103) and putting a voltage on the appropriate color column line (101)–(103). The voltage on the column line controls the intensity of the color represented by the light element. By appropriate choice of red-green-blue intensity ratios the color of the pixel is determined, from black (all off) to white (all full on).

Figure 15:
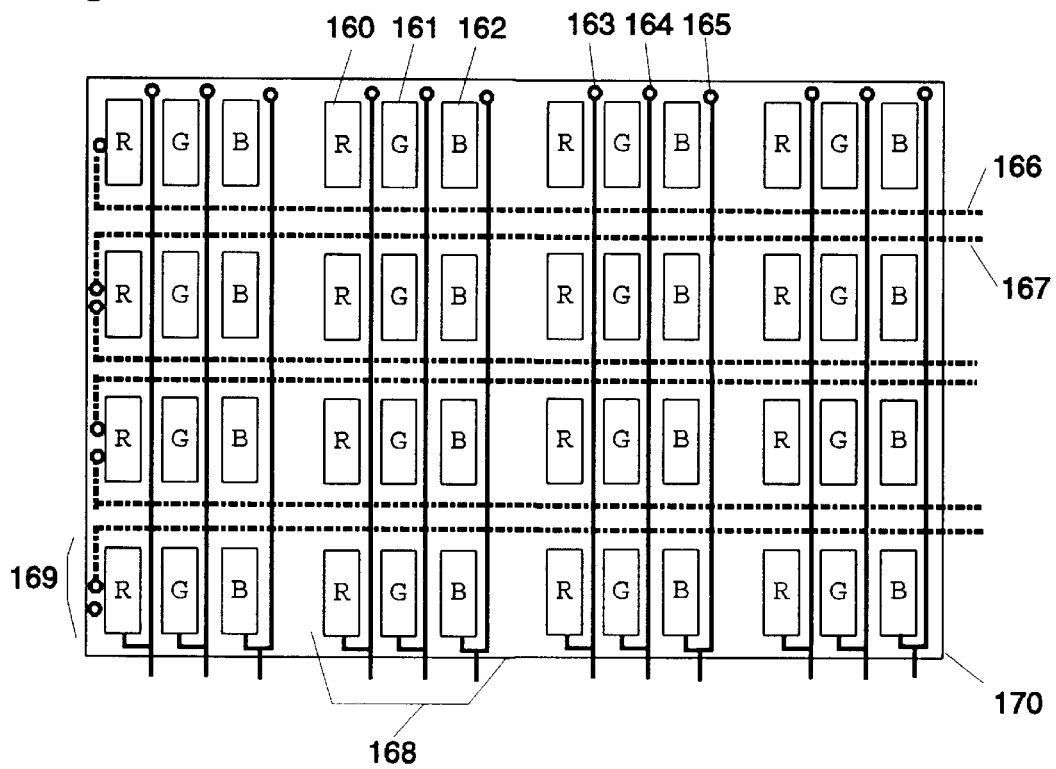
FIG. 15 shows a wiring detail of a single tile.

FIG. 15 shows how the interconnection lines are run in the shadow areas between the light valves. The tile of FIG. 15 has 16 pixels arranged in rows (169) and columns (168) of four pixels each. Each pixel is made up of red (160), green (161) and blue (162) light valves. The top surface of the lower plate (170) of the tile has two layers of interconnection lines, separated by an insulating layer. These two layers of lines are the column lines (163)–(165), which supply red/green/blue signals, and the row lines (166) and (167), shown dotted, which are the ground and gate lines. These lines are connected to edge connectors which are wrapped around an edge of the tile to the bottom of the tile or tile carrier, as discussed below, and then are connected to lines on the back plate to interconnect the tiles.

The difficulties in obtaining optically clean insulation materials for interconnections on the back plate may be overcome by stripping them out of the light valve shadow areas. Another option is to use separate glass plates for the orthogonal sets of interconnections. This embodiment requires that one plane of interconnections either be on the bottom of the AMLCD tiles or on a glass tile carrier the same size as the AMLCD tile.

Figure 4:
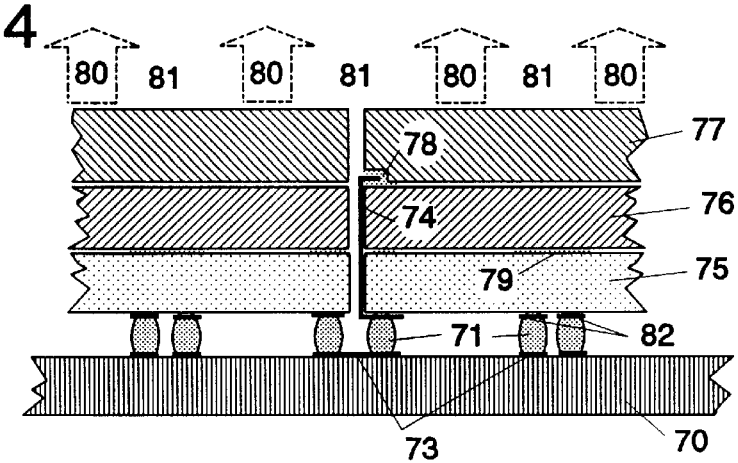
FIG. 4 shows the interconnections between a tile and a neighboring tile, and from the tile to the tile carrier.

In the preferred embodiment (see FIG. 4) the sequential steps are minimized by using a glass tile carrier (75) containing one layer of interconnections, the solder joint pads (82) and a patterned adhesive layer (79) for attachment to the AMLCD tile. The adhesive pattern (79) is in the same locations as the interconnection set and is contained within the dark space (81) as previously indicated.

One feature of the interconnection on the tile carrier is that it may have more than an order of magnitude higher conductivity than the metallurgy deposited within the tile. Thus, R-C time constants are much improved over monolithic structures. This high conductivity feature is also true for the interconnection on the back plate supporting the tiles and joined to them by either solder joints on pads (C4) or alternative means such as conductive adhesives. Depending on the pixel size (viewing distance) and light efficiency (fraction of dark area), the interconnection lines can be in the same range of width and thickness as those used on printed circuit boards and may be of copper metallurgy. Impedance control is not necessary and substantial nicks and other defects in the line are not critical as long as continuity is maintained.

Furthermore, the lines will be repairable with brazed or soldered wire. Economical back plates, in a preferred embodiment, contain a sandwich of chromium/copper/chromium (Cr/Cu/Cr).

It is preferred to make the edge connection pads on only two sides of each tile, rather than on all four sides. This saves the space for the pads and the space for a lead frame type connection, of which Tape Automated Bonding ("TAB") is a preferred example. The seal can do double duty as a conductive adhesive electrical joining media, as well as a seal. The edge position tolerances can be decreased by very precise cutting of the tiles (in the range of a few microns) and positioning of the tiles by using solder-joint self alignment. The width of the seal can be minimized by using the most advanced manufacturing tool and process, for example a fine line dispensing needle such as the Micropen™ device. Use of the thinnest possible TAB designs is also important. These features are shown in the embodiments in FIGS. 3, 4 and 5a–d. The top layer of the back plates contains a photoprinted solder mask which defines solder pads for use in the passive location of the tile.

In passive alignment the locations of the tiles in the x and y directions relative to each other is determined by the photolithographic patterns for location of the solder joints connecting the tile carrier or tile to the back plate. Surface tension forces the tile into location. The z height of the solder joints is determined by the volume of solder, the area of the pads on the back plate and on the tile or tile carrier, the lithography, and the shape taken by the solder joint under the weight of the tile or tile carrier and the counter-forces of the surface tension in the solder. Thus, the designs of the pad patterns and their tolerances are stringent and have to be sufficient to accomplish the self-alignment task while supporting the mass of the tile or tile plus tile carrier. In the present case, the solder joints are limited in size by the interconnection spacing, so as to be safe from electrical shorting if no insulating coating is placed over the interconnection lines.

An alternative to passive alignment is alignment by automatic or visual tooling placement, usually by using split optics to center the two interfacing patterns of pads. In this case the z height is determined by precision spacers (metal, polymer or glass spheres), or other mechanical methods. The electronic joints may then be accomplished by conductive metal sphere- or particle-filled adhesives. These may be combined with the spacers, if desired. The key to reliability in these cases is to balance the z-direction thermal expansion adequately so that the metal connections will not be broken. Dendrite-like contacts may also be used here.

Construction of the Flat Panel Display Assembly

Figure 6:
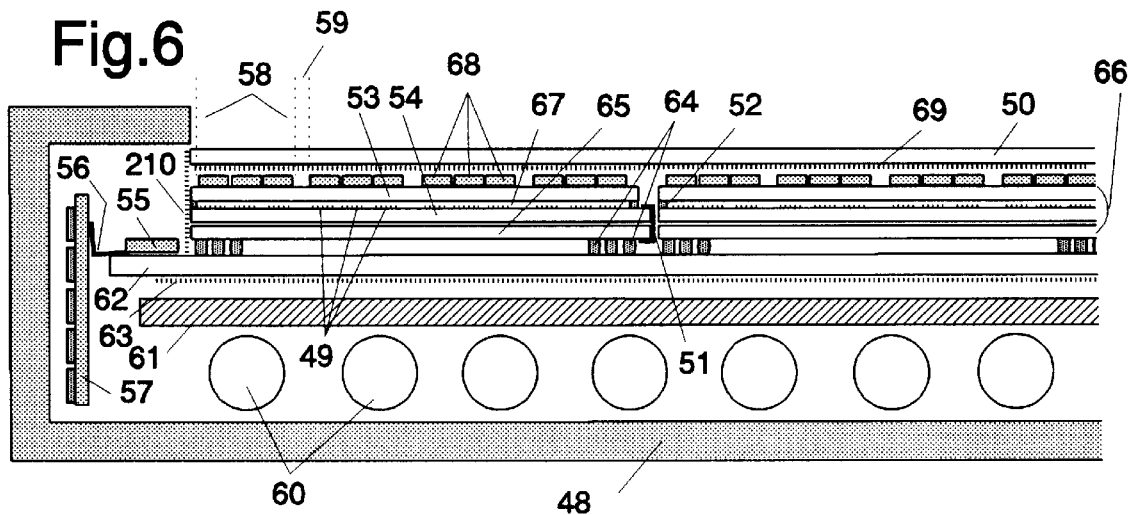
FIG. 6 shows a side cut-away view of a part of a display constructed according to the teachings of the invention.

FIG. 6 shows a side cut-away view of a part of the AMLCD of the invention. The tiles (66) have a plurality of individual pixel areas (58), each comprising three light valves (49) (one for each of red, green and blue) and dark areas between (59).

In this design the lighting is in the form of backlights (60) illuminating the display through a diffuser plate (61). A polarizer (63) on the back of the bottom plate (62), or on the diffuser, or even possibly between the tile and the tile carrier polarizes the light from the backlights (60). Traces on the top of the back plate (62) carry row signals in the direction into the paper in FIG. 6, and passive self-alignment solder joints

(64) on the traces locate and mount the tile carriers (65), which have the column traces on their lower sides, so that they bridge over the row lines on the bottom plate (62). TAB flex lines (51) connect the tile carriers (65) to the AMLCD tiles (66) which comprise an upper (53) and lower (54) plate, held apart by seals (52) The space between the upper (53) and lower (54) AMLCD plates is filled with the liquid crystal (67) which forms the operative part of the light valve.

Color filters (68) are formed on top of the upper plate (53) (or on the bottom) in order to color the light transmitted through the individual light valves (49) red, green or blue, as appropriate. The space (59) between the pixel areas (58) is masked opaque, and provides a space for interconnections and active devices. A second polarizer (69) on top of the color filter layer, cross polarized to the first polarizer (63), allows the LCD to operate.

Finally, a protective cover plate (50) completes the display, covering all of the tiles. The cover plate is sealed by a layer of sealing material (210) to the back plate. Preferably, within the sealed space a substance such as an active metal or desiccant is placed in order to reduce or eliminate the effects of humidity.

Figure 13:
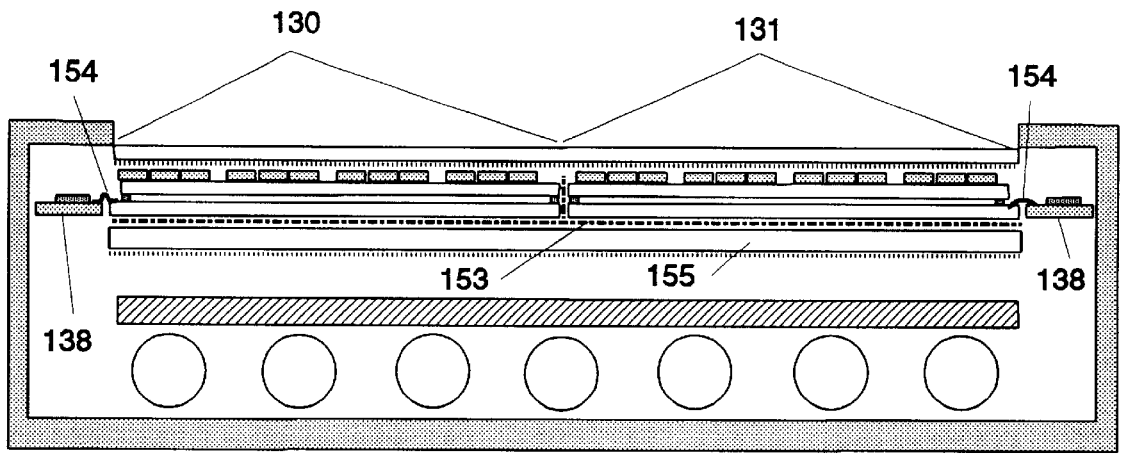

The entire assembly is mounted in a housing (48), containing the AMLCD and any required printed circuit electronic boards (57). Driver ICs (55) may be on the bottom plate itself (62), as shown in FIG. 6, with flexible leads connected to the other electronics on the PCB. Alternatively, as shown in FIG. 13, ICs (55) for the row and column lines are mounted on the circuit boards (138) and are connected, preferably by flexible wires (154)

To make this embodiment work efficiently the insulation between the two circuit layers (if used) should be optically clean; solder connections and interconnections must be organized in a pattern outside of the light valve area of each pixel and anti-reflection coatings are preferably applied.

One method of creating both a seal and the interconnection in the same space at the edge of a tile is to use conductive adhesive. A typical embodiment of the interconnection consists of bonding pads of approximately 3,000 to 10,000 angstroms thickness of aluminum deposited on titanium or chromium on the lower plate of the AMLCD tile. A conductive adhesive with gold spheres in the range of 5 to 10 microns would be appropriate to join the aluminum pads to a gold plated TAB interconnection of 10 to 15 micron thickness, as detailed in FIG. 3 and discussed below.

Details of Tile Manufacture

FIGS. 5a–5d show the steps in assembling the tiles.

Figure 5A:
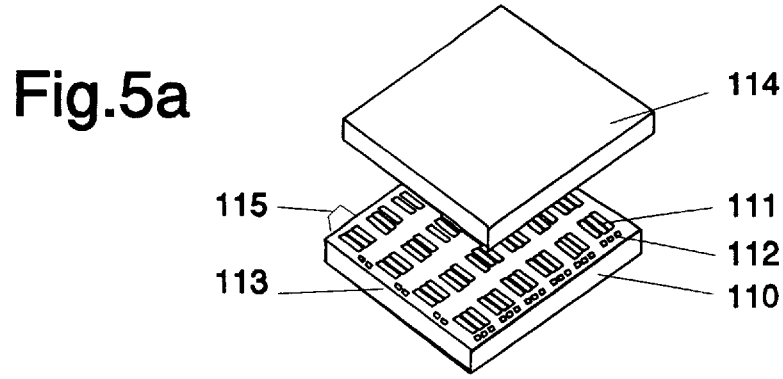
FIGS. 5a–d show side perspective views of the single tile, as the edge TABs are added.

In FIG. 5a it is seen that the light valves, assembled in groups of three (115) (i.e. pixels) are formed on the top surface (111) of the lower plate (110). Row connection pads (113) and column connection pads (112) are formed in the edge area of the lower plate.

Figure 5B:
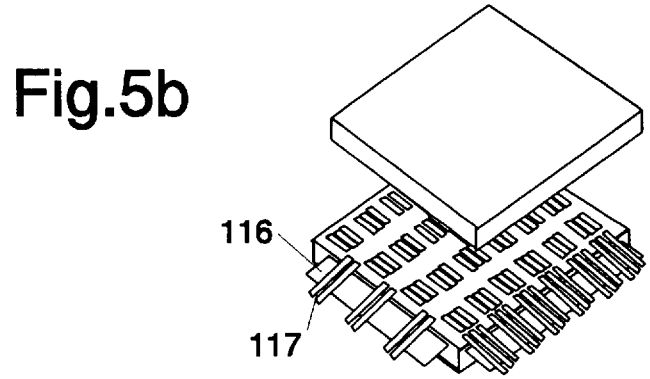

FIG. 5b: Tape Automated Bonding (TAB) carrier strips (116) containing flex lines (117) matching the bonding pads (112)(113) are placed along the edges of the bottom plate (110). The details of the TAB, the bonding and the edges of the plates are shown in FIG. 3 and discussed below.

Figure 5C:
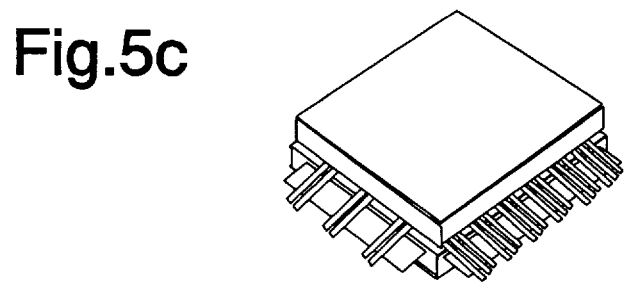

FIG. 5c: The top plate (114) is aligned to the bottom plate (110) and the two are bonded as discussed in FIG. 3 below.

Figure 5D:
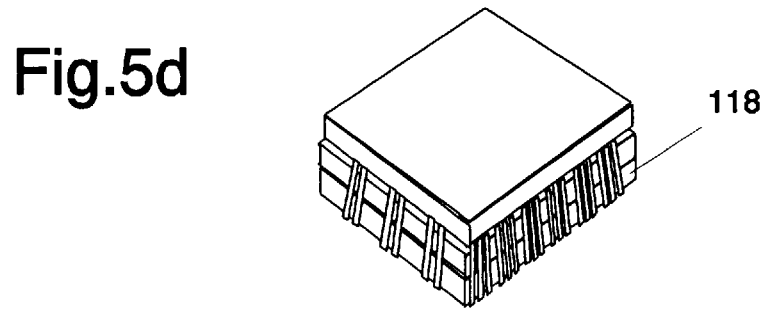

FIG. 5d: The TAB leads are bent over and connected to a tile carrier (118).

Variations of Edge Connections for Tiles

The tile of a typical conventional design does not have enough vertical room to insert the lead-frame type interconnection (or TAB) between the top and bottom monolithic plates. In the preferred embodiment it is desirable to make as few changes as possible to the AMLCD design.

Therefore, it is preferable to keep the conventional adhesive seal material and to maintain the conventional glass bead spacing usually used by tile vendors. The solution to keep the same vertical space is to etch or cut a ledge (29) into the top plate (24) of the AMLCD, as shown in FIG. 3. Preferably the ledge (29) would be etched at the front end of the AMLCD process in the large glass plate which are later cut or scribed and broken into tile top plates.

FIG. 3 also shows a detail of a perimeter TAB connection to an AMLCD tile. The top plate (24) is aligned above the lower plate (25). The TAB (23) is positioned above the interconnection pads (20). Adhesive (21) fills the area above and below the TAB (23), and gold-plated nickel spheres (26) provide the electrical connection. As an alternative, noble-metal plated polymer or glass spheres could be used.

An estimate of adhesive (21) thickness is 3 microns above and below the TAB (23). Therefore, the combined height of TAB (23), adhesive seal (21) and aluminum interconnections and gold spheres (26) is approximately 16 microns, assuming the spheres (26) are adequately deformed as in a wire bond to imbed them in the aluminum pads (20) and TAB (23). The stress to create this deformation is applied when the top plate (24) of the tile is pressed down on the lower plate (25).

The required precise separation between top (24) and lower (25) plates are established and maintained by spacers such as glass beads (28a) in the seal area. Also, plastic spacer beads (28b) can be included in the liquid crystal (27) area of the tile. A typical separation is five microns.

FIG. 18 shows an additional embodiment for the ledge on the edge of a tile. In this embodiment, the edge of one of the plates (202) is extended beyond the edge of the other plate (201), forming the ledge (206). The lead connections (200) can then be connected to pads on this ledge. In FIG. 18, the gap (203) between the plates (201) and (202) is maintained by spacers (204) in the seal (205) and adjacent to it.

Figure 14:
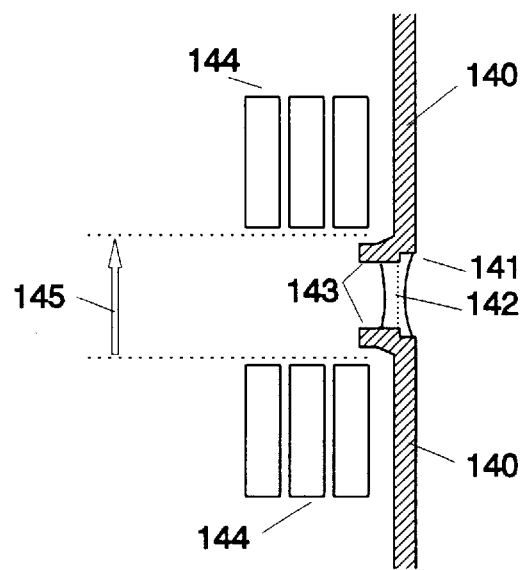
FIG. 14 shows a detail of an edge seal on a tile.

The seal must have an opening or orifice through which the liquid crystal flows to fill the spacing (typically 5 microns) between the top and lower plates of the AMLCD tile (see FIG. 14). This is accomplished by evacuating the air, followed by immersion of the orifice into the liquid crystal material. The orifice may be on either the front edges (containing the interconnection pads) or the back edges of the tile. Orifices in the range of 5 to 10 mils wide, situated along the edges in the dark spaces of the tile, are the preferred embodiment. These are preferably on the back edges so they will not interfere with the TAB and interconnections which exist in the dark spaces on the front side. Following filling with liquid crystal, the orifices must be sealed. More than one orifice may be used, if necessary.

There is a concern that there will be a lump of seal material left on the edge of the tile. This is not allowed for in the tolerances for inter-tile spacing. Therefore, a cut (141), as shown in FIG. 14, in the thickness direction can be made at the edge of the tile. The cut (141) is wider than the orifice (143) in the seal (140), and is located in a dark space (145) between pixels (144) so as not to interfere with the light transmission of the tile. Epoxy (142) is then used to fill the cut (141), and forms a complete seal of the orifice (143) without extending beyond the perimeter of the tile.

Conductive adhesives are currently available for a sufficient range of interconnection pad sizes so that with the appropriate size and density of conductive spheres mixed into the adhesive, a distribution of several spheres per pad are achieved. This is done to guarantee redundancy in the interconnection. Since the preferred design is to have the interconnection pads as small as possible, it is important to optimize the adhesive material to maintain the viability of the adhesive material already developed for AMLCD application, including the redundancy capability. Reworkable adhesive is preferred in this application.

A preferable embodiment uses a TAB that is available in the market with an engineered surface equivalent to the spheres of a conductive adhesive. Such a product is a TAB with a contact surface containing dendrites, produced by IBM Corp. for semiconductor packaging and separable connector applications. This TAB is described in German Patent number 2816328, issued Apr. 14, 1978 to Babuku, et. al. The dendrites in this embodiment are preferably made of plated palladium, plated on TAB contacts with nickel and gold overplate.

A TAB which can be expected to produce reliable and high yield bonds is preferably in the range of 10 to 15 microns thickness, with 5 to 10 micron high dendrites. This TAB should be located in the top plate of the AMLCD at the perimeters of each tile when the lower plate is sealed to the top plate. An etched pattern in the top plate is used to contain the TAB in the proper location. The versatility of achieving an optimized depth of an etched pattern in the top plate is easily achieved using buffered HF, the etch for silicon dioxide in the semiconductor industry. Two layers of adhesive seal are used, one on the top plate and one on the lower plate. The volume of adhesive seal is precisely controlled by applying it with a fine line dispensing needle, such as the Micropen™ device. The seal is positioned so that it does not squeeze into the light valve area.

A less expensive embodiment which saves space, and does not require the polymide flex carrier for the TAB, uses a thin copper foil, standard in the electronic packaging industry, and used for making fine line circuitry on printed circuit laminates. The surface of such foils are treated to provide them with excellent mechanical adhesion to laminates. The foils can be etched into a lead frame or TAB-like pattern, and then plated with nickel followed by gold. The gold should be thick— several microns—to make it easily deformable, and also to allow bending around a tile edge. The basic copper foils can be as thin as 6 microns, preferably around 9 microns, but could be as thick as 12–16 microns. The compromise is between saving space on the one hand, and bending durability on the other.

Another embodiment of the edge interconnection and seal maintains the seal independent of the interconnection bonding area. In this case two sides of the lower plate of the AMLCDs (orthogonal to each other) are left open for bonding. The top plate is smaller than the lower plate on these two sides. A ledge width for bonding may be 2 to 4 mils or larger with 2 mils perhaps the leading edge state of the art with one mil wire bonds. One advantage of this design is that conventional wire bonding or conventional TAB bonding could be used. The disadvantage is that the wire bonding is a sequential process with a cost in the range of one cent per bond. A second major concern is that additional space is used for the seal which decreases the light valve space as noted above.

Another method of connection is to apply a metal frit or sputtered, evaporated, or plated thin metal film to the side walls of the tiles. While this method holds promise, there are problems in ensuring a reliable contact across the edges from top and bottom to sides. In a variation on this technique, slots could be cut into the glass along the edges, one slot per edge connection, and filled with conductive metals. This technique would have the same problems with contact across the top/side and side/bottom joints as the frit or film techniques.

Intra-tile Connections

One of the difficult tasks in the connection technology both at the edge of an AMLCD tile and internally within the tile in the monolithic area is to join the top indium-tin-oxide layer to those on the lower plate, and thus to the edge connector system. In the standard application of AMLCD there is a very large periphery area, and is hidden from the viewer by a frame. In this area there is room for very large connection areas between the ITO (Indium Tin Oxide) layer on the bottom surface of the top plate and the metal or ITO pads on the top surface of the lower plate, linked by a conductive adhesive which may be a silver-filled epoxy. Electrically, this is a ground contact for the top ITO layer.

In the designs of the present invention, the seals must be made as narrow as possible, which limits the room for the ITO to edge connections. Therefore, an alternative to the standard approach is desirable.

One technique for grounding the ITO layer of the plate to the lower plate is to combine the functions of the seal and the ground connection by using a conductive adhesive for the seal which contacts appropriately placed metal pads on the lower plate in the seal area.

Another technique for connecting the electrical connections between the upper and lower plates is to combine the intra-tile connection function with the TAB (lead frame) edge connections. This is done by making the TAB connections two-sided as needed. The dendrites or other engineered surface on the top side of the TAB connects to the ITO layer on the top plate, while the bottom of the TAB connects to the contact pads on the lower plate. Thus, combinations of connections to top and lower plates can be made with a group of TAB connections along the edges of the tiles when the top plate is pressed down and sealed to the lower plate.

Figure 16:
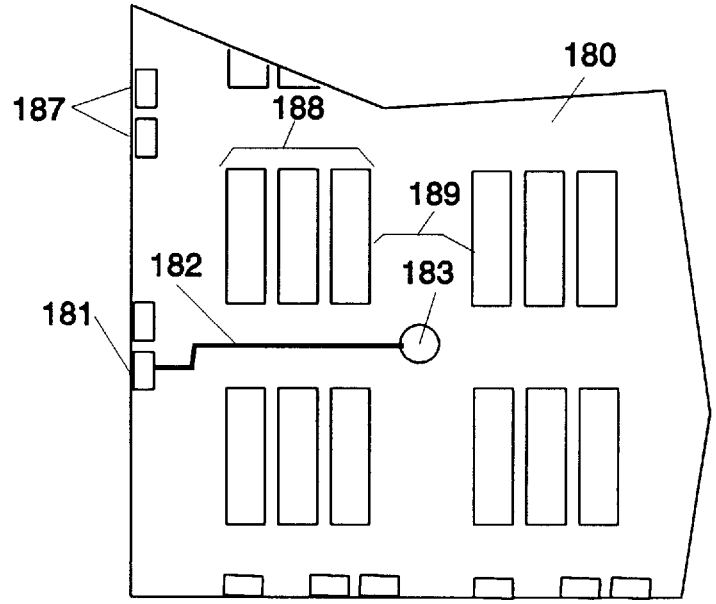
FIG. 16 shows a part of a single tile, showing the intra-tile connection technique.

Another alternative is shown in FIGS. 16 and 17. FIG. 16 shows a part of the lower plate (180) with various edge connections (187), and a few pixels (188) and the dark spaces (189) between. As an example, to interconnect the ground leads on the top and lower plates, an intraconnection pad (183) is formed in a dark-space area on top of the lower plate (180). The pad (183) is connected to the ground edge connector (181) by an metal line (182) deposited on the lower plate (180).

As shown in FIG. 17, the intraconnection pad (183) on the lower plate (180) is connected to the ITO layer (185) on the top plate (186) using a conductive material (184), such as the conductive adhesive discussed earlier. Conductive adhesive is an adhesive containing conductive particles, which can be solid metals or metal-coated non-conductive particles. In this context, the term "particles" includes conductive elements such as the spheres described elsewhere in this specification, or flakes or powders, or other variations. Alternatively, a non-conductive glass or polymer spacer could be plated with nickel or gold and used to fill the adhesive.

Cutting and Assembling the Tiles

If the AMLCD top and bottom plates are cut from a larger panel prior to alignment and sealing, as shown in FIG. 5, all of the individual tiles must be aligned separately. The following method, in which the monolithic panels are fabricated first and then cut into tiles, is preferred.

Figure 8:
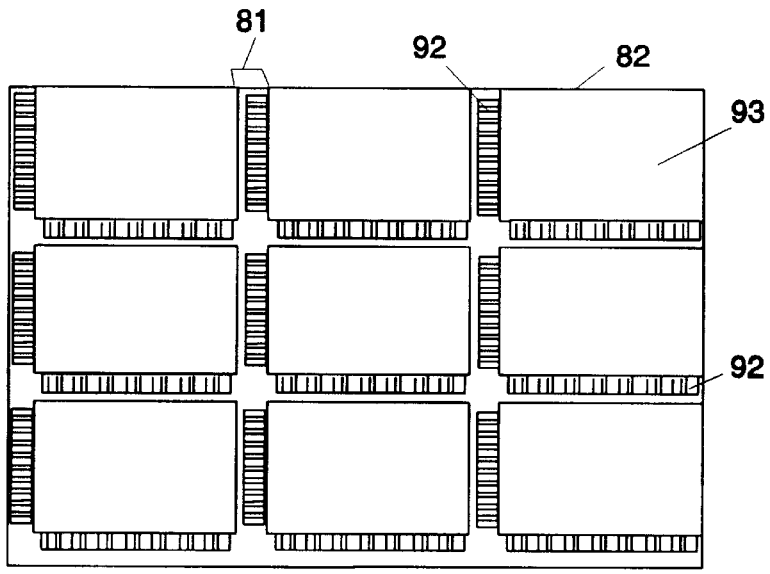
FIG. 8 shows a top view of the etched glass for making tiles from a single large plate.

1) Etch or cut the glass sheet for the top plate (82) as shown in FIG. 8. Ledges (81) are etched or cut along all sides of the areas (93) which are to become individual tiles.

2) Deposit the precise seal adhesive on the monolithic panels (82) with a fine line dispensing needle, such as a Micropen™ device.

3) Align all the TABs (92) in etched ledges (81) containing the seal, as shown in FIG. 8.

4) Align the monolithic top (82) and bottom (83) plates for all the tiles at once.

5) Compress the top and bottom plates together under the desired load.

6) Cure the adhesive seal in an oven.

Figure 9A:
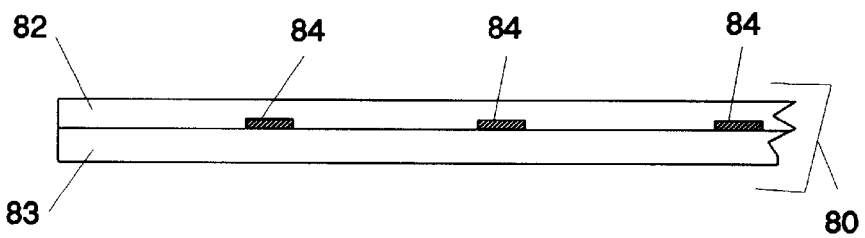
FIGS. 9a to 9e show a side view of the cutting of the etched glass from FIG. 8.
Figure 9B:
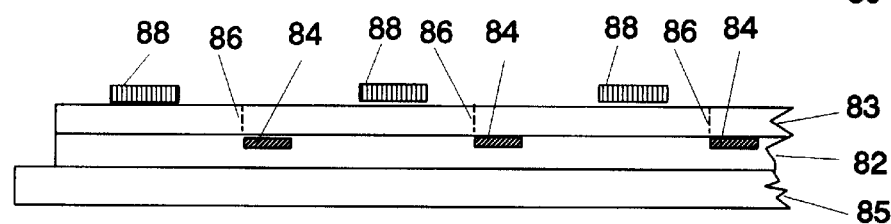

The result is a set (80) of monolithic tiles (82) and (83), aligned and sealed, with TABs in etched ledges (84), as shown in FIG. 9a. A special sequence of precision cutting is followed, as shown in FIGS. 9b–e.

7) The monolithic set of tiles (80) is clamped at points (88) to a holding plate (85) on the top side and inverted. (see FIG. 9b)

8) A first cut (86) is made through the bottom plate up to the etched area (ledge) (84), one cut per tile.

Figure 9C:
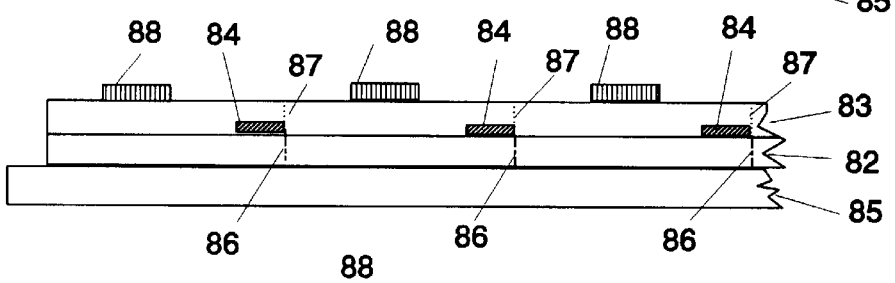

9) The assembly is unclamped and inverted and reclamped as in FIG. 9c.

10) A second cut is made through the top tile (82) as shown at (87) in FIG. 9c.

Figure 9D:
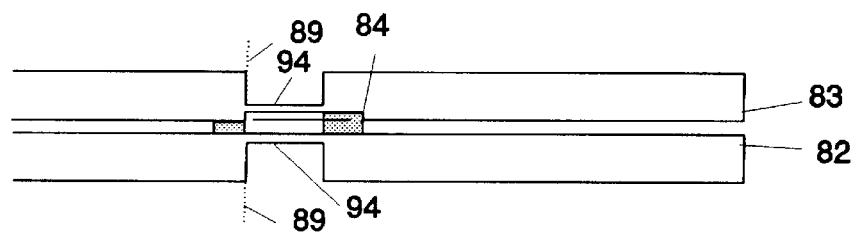

11) As shown in FIG. 9d, cut (89) is made through the top glass in multiple passes, until a desired thickness, such as 2 $\mu$m, of glass remains (94).

13) The tiles are inverted, and step 11 is repeated for the other side. The remaining glass (94) will fracture as the glass is lifted away, and the fractured glass powder can be removed easily.

Figure 9E:
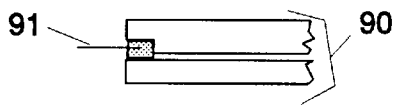

14) The tiles are now free to be separated, as shown in FIG. 9e, with the tile (90) having the TAB (91) protruding from the ledge inset into its edge.

The wasted area per tile is only as long as a TAB which is long enough to reach down an edge and join to the underside of the tile carrier—approximately 1.5 mm long.

Assembly of the Tiled Structure

The process sequence for the preferred embodiment is as follows:

1) make an AMLCD tile with edge interconnections as described above, 2) make a tile carrier as described above, 3) adhesively join the tile carrier with micron alignment tolerance to the AMLCD tile 4) bond the interconnections from the AMLCD tile to the tile carrier, 5) place the tile carrier and AMLCD tiles on the back plate containing a single layer of interconnection, 6) reflow the solder, allowing self alignment of the tile carrier and AMLCD.

This process allows each individual component to be tested prior to assembly and maintains the simplest possible sequential process for each component. In addition it maintains the cleanest and least risky optical path with options for anti-reflection coating of each component, if desired.

A smaller number of circuit lines on the tile carrier may be designed with narrower lines. One mil wide circuit lines are adequate. This technology has been used to make metallized ceramic chip carriers of higher local density on a very rough surface with approximately the same number of fine circuit lines as desired in the tiled display application. The yields for making circuit lines on tile carriers which are smooth glass are expected to be high.

Method of Manufacture of the Entire Display Assembly

FIG. 11 shows a flowchart of the method of the invention, in producing large flat-panel displays from smaller AMLCD display tiles. The first process (120) is to prepare the glass sheets through the steps of fabrication of the large sheets, cutting and beveling, and cleaning.

The next three processes may be undertaken in parallel: The back plate is prepared (122) by the following steps:

a) blanket sputter Cr—Cu—Cr metallization b) photoform and etch top interconnection patterns c) photoform and etch Cr from bonding pad areas d) strip and clean resist from entire panel e) test for electrical open lines and shorts between lines f) deposit an accurate volume (+8–10%) of solder paste by screening g) reflow solder paste to solder pads
   Alternatively, steps f and g may be replaced by placement of solder spheres on all pads followed by reflow of solder h) inspect with laser profilometer all solder pad sites for height and presence of solder.

i) Repair defective sites. The tile carriers are prepared (123) in a similar fashion up to step e, above.

Then a thin film of gold may be added by electroless plating or electrolytic plating of all pads to enhance solder wetting.

The individual AMLCD tiles are prepared (121) by thin film fabricating a large monolithic plate and cutting the plate as discussed above. Then the ground contacts, color filters and polarizers are attached to the tiles. These might also be made part of the display assembly as shown in FIG. 9, if preferred. The tiles are sealed and the liquid crystal material is filled into the gap.

Finally, the tiles are functionally tested electrically and optically, and the unacceptable tiles repaired or discarded.

The outputs of the last three processes (121), (122) and (123) are then used in the panel assembly process (124). The tiles are attached to the tile carriers, and the flex edge connectors (TABs) are added and attached as discussed above. The tiles on their carriers are attached to the back plate and aligned using the passive alignment techniques as described in copending U.S. patent application Ser. No. 08/297,958, filed Aug. 31, 1994. Finally, the assembly is inspected and tested optically and electrically.

The back plate assembly containing the array of tiles is then assembled (125) by adding the pixel driver circuits and display electronics to the screen assembly. The screen and electronics are mounted on a backlight box (not shown) and a power supply is added, and the entire package is placed in a suitable housing. Finally, the entire unit is inspected.

The completed flat screen display unit is tested (126) and checked for continuity across all tile perimeters. The drivers are set to provide brightness and color matching across the interfaces. The unit is subjected to a basic function test, then to accelerated tests for reliability. The unit is then ready for delivery and incorporation into the final product.

Rework Methods

Rework capability is an important aspect of an assembly of expensive components, such as the tiled display of this invention. If one tile in the display assembly is not functional, scrap costs include all of the tiles on the assembly. Therefore, if a tile could be removed and replaced with a functional tile at a reasonable cost (on the order of 10–20% of the display cost) it would be profitable to rework, even if the overall assembly yields are high.

There is no easy solution to reworking such a tightly-spaced assembly of tile components. In other applications of the solder-joint alignment techniques preferably used to align the tiles in this invention, such as the packaging industry, ample space between components allows individual components to be reheated to melt the solder and to be lifted out of the assembly without disturbing neighbor components. This is not practical in the display of the invention, because of the requirement that the tiles be spaced to maintain the inter-pixel spacing across tile boundaries.

Furthermore, a design for rework requires that the tiles should not be touching; otherwise when the defective tile is lifted out, the neighboring tiles will be disturbed. Therefore, the precision requirement for the space between the tiles should be approximately 5–10 microns. The alignment method detailed above could be used for reworked tiles, with a placement accuracy of 3–5 microns.

One method which could be used is to design the solder joints, adhesive, and/or the pads on which the tiles are mounted, in size and density, not only to maintain precise location but also to make it possible to mechanically fracture the joints by applying a force in tension. Because of the lack of space to mechanically grip the tiles, they must be removable and replaceable using a vacuum chuck. About 14 psi is adequate to fracture an array of joints on a tile, provided the number of joints and cross-section are within certain limits which are adequate for both interconnection and precise alignment. Alternatively, a combination of heating and mechanical force may be used.

For example, on a one centimeter square tile, there may be in the range of one hundred joints. For solder cross-sections in the range of 20 sq. mils, a vacuum force of 14 psi results in 700 psi on the solder. Even at room temperature solder will creep to fracture under such stress, lifting the tile from its site. If necessary, temperatures less than the melting point, but high enough to decrease the creep strength, may be applied. After repair of the tile, or supply of a new one, the solder pads may be redressed and the tile rejoined by means available to the industry, such as conductive adhesive, or solder. The replacement tile must be accurately positioned manually, using a microscope, to maintain the interpixel periodicity across the tile joints.

Variations for Displays with Higher Line Density

It should be evident to those skilled in the art and science of electronic packaging (interconnection and assembly) and optical technology that there is substantial versatility to make larger or smaller displays with the designs and processes discussed in this specification. To achieve higher line density, the space used for interconnection at the tile edges and for sealing of the tiles should be made as small as possible. One mm pixel pitch, in an array for a 35 to 40 inch TV application, could be manufactured with the current manufacturing infrastructure. Use of a smaller pixel pitch would facilitate work stations and high end computer applications.

It is possible to use the techniques of the invention for higher pixel density tiled displays in which each tile has at least one edge adjoining the perimeter of the display (that is, there are no "inside" tiles completely surrounded by other tiles), as shown in FIGS. 12*a*–12*c* and FIG. 13. In such cases there is no need to fit the interconnections (134) into the inter-tile gaps, but they can be routed to a circuitized back plate (155) for a simpler interconnection. The individual tiles still must be accurately aligned to maintain uniform interpixel periodicity. This can be accomplished by passive alignment, using reworkable solder joints and lands on the tiles and back plate, or (preferably) by using reworkable adhesive bonding of the tiles to the back plate and each other using an optical adhesive having a refractive index matched to the tiles and the back plate, and appropriately placed spacers.

For two (FIG. 12*a*) through four (FIG. 12*b*) tile arrays it is possible to do all the interconnections from the tiles to the circuitized back plate on the perimeter of the display, using tiles with interconnections on two sides (130)–(133). However, using additional layers of interconnections on the tiles, it is possible to route all interconnections to one edge of some tiles (136)(137), allowing six or eight or more tile arrays as shown in FIG. 12*c*.

Figure 12A:
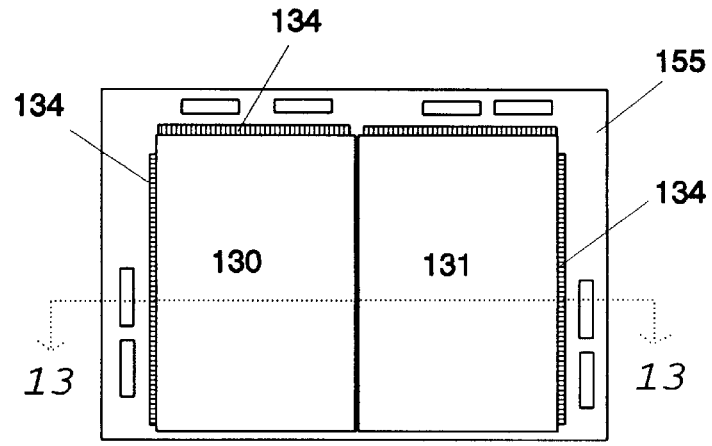
FIGS. 12a–c show high line density tiled displays, with all tiles having edges along the perimeter of the display, using two, four and six tiles, respectively.
Figure 12B:
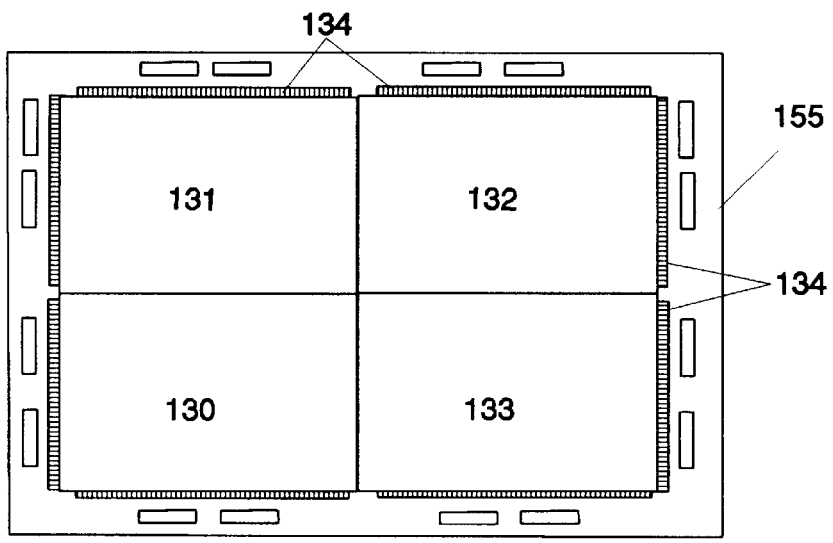
Figure 12C:
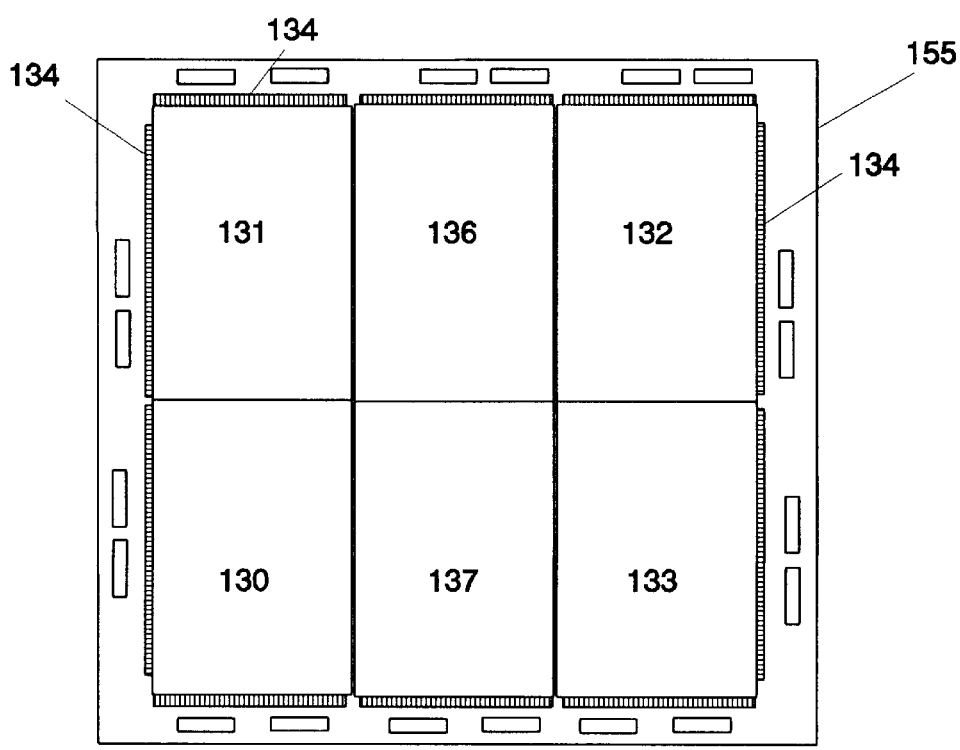

FIG. 13 shows a side cut-away view of such an arrangement along the lines 13—13 in FIG. 12*a*, similar to FIG. 6 in the larger display embodiments, except that in this particular embodiment, the tiles (130) and (131) are connected to the PCB (138) using flex leads (154). A layer of optical adhesive (153) is inserted between the tiles (130) and (131) and fastening the tiles to the back plate (155). The refractive index of this adhesive is matched to that of the glass of the back plate (155) and tiles (130)(131) so as to minimize reflections and make the lines between tiles less visible.

Alternatively, the lower glass plate of the tiles (130) and (131) can be extended for the placement of driver chips connected through interconnections (134). The bottom plate, in this case, will be extended to the same extent.

In these tile arrangements, using tiles of similar size to current technology, flat panel displays of 25–40 inch diagonals become practical, allowing viewing distances equal to the depths of desktops. This embodiment is applicable to lower density displays, as well.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A large flat panel display comprising:
   a) a plurality of tile display modules, each tile display module having a plurality of pixels arranged in a matrix having uniformly periodic interpixel spacing, said pixels comprising an active area and an inactive, dark area, and each tile display module having electrical interconnection means for addressing the pixels such that each pixel may be selectively controlled through the electrical interconnection means, and pads for interconnecting with the electrical interconnection means; and
   b) a back plate for supporting and interconnecting the tile display modules, having at least one layer of optically opaque interconnection lines for connection to the electrical interconnection means of a plurality of the tile display modules, said at least one layer of optically opaque interconnection lines forming a light shield being disposed in said inactive, dark areas of said pixels, thereby forming a mask structure, the optically opaque interconnection lines having pads for electrical connection thereto;
   the tile display modules being mounted upon the back plate, with the pads of the tile display modules being electrically connected to the pads of the interconnection lines of the back plate, aligning the tile display modules thereon, and located such that the interpixel spacing between two adjacent pixels on two adjacent tile display modules maintains the uniform periodicity of the interpixel spacing between adjacent pixels within the tile display modules, and
   the pixels of the large flat panel display being addressed via the interconnection means of the back plate as if the large flat panel display comprising a plurality of tile display modules were a single monolithic large display.

2. The large flat panel display of claim 1 in which the tile display modules are backlit through the back plate.

3. The large flat panel display of claim 1 in which the tile display modules comprise liquid crystal displays.

4. The large flat panel display of claim 3 in which the liquid crystal displays are active matrix liquid crystal displays.

5. The large flat panel display of claim 1 in which the tile display modules comprise layers bonded together by an adhesive.

6. The large flat panel display of claim 5 in which the adhesive has conductive elements for connection to the electrical interconnection means of the tile display module.

7. The large flat panel display of claim 6 in which the conductive elements are conductive particles.

8. The large flat panel display of claim 5, in which each of the tile display modules further comprises lead frame type connections located in the dark space between tile display modules, and arranged such that the interpixel spacing between two adjacent pixels on two adjacent tile display modules maintains the uniform periodicity of the interpixel spacing between adjacent pixels within the tile display modules, the lead frame connections having a first end connected to the electrical interconnection means of the tile display module and a second end connected to the pads of the tile display module, and the first end of the lead frame type connections has a plurality of nodules for enhancing contact between the lead frame and the electrical interconnection means.

9. The large flat panel display of claim 8 in which the nodules are formed of a material selected from the group consisting of palladium, nickel and gold.

10. The large flat panel display of claim 5, in which each of the tile display modules further comprises lead frame type connections located in the dark space between tile display modules, and arranged such that the interpixel spacing between two adjacent pixels on two adjacent tile display modules maintains the uniform periodicity of the interpixel spacing between adjacent pixels within the tile display modules, the lead frame connections having a first end connected to the electrical interconnection means of the tile display module and a second end connected to the pads of the tile display module, and the first end of the lead frame type connections has a plurality of dendrites for enhancing contact between the lead frame and the electrical interconnection means.

11. The large flat panel display of claim 5 in which the adhesive also functions as a seal between the layers of the tile display modules.

12. The large flat panel display of claim 11 in which the adhesive is deposited around the edges of the tile display modules in a width such that the interpixel spacing between two adjacent pixels on two adjacent tile display modules maintains the uniform periodicity of the interpixel spacing between adjacent pixels within the tile display modules.

13. The large flat panel display of claim 5 in which the adhesive is conductive,
    at least one of the facing sides of the layers is coated with a transparent conductive substance,
    the facing side of the other layer has conductive pads in the seal area, and
    the conductive pads of one of the layers are connected to the transparent conductive substance coated on the other layer.

14. The large flat panel display of claim 13 in which the transparent conductive substance comprises Indium Tin Oxide.

15. The large flat panel display of claim 11 in which:
    the layers of the tile display modules comprise at least an upper and a lower plate of a liquid crystal display, with the liquid crystal being located between the upper and lower layers, contained by the adhesive acting as a seal, the seal being of a width such that the interpixel spacing between two adjacent pixels on two adjacent tile display modules maintains the uniform periodicity of the interpixel spacing between adjacent pixels within the tile display modules; and a gap is left in the seal forming an orifice, and the tile display modules further comprise a notch in one edge thereof, aligned with the orifice, and the liquid crystal is introduced between the upper and lower layers by evacuating the area between the upper and lower areas, introducing the liquid crystal through the orifice, then sealing the orifice, such that the seal in the orifice fits in the notch in the edge of the tile display modules and does not extend beyond the edge.

16. The large flat panel display of claim 15 in which the orifice is aligned with the dark space between the pixels.

17. The large flat panel display of claim 5 in which the first layer of each of the tile display modules is coated on the side facing the second layer with a transparent conductive substance, and the tile display module further comprises:

a) at least one ground intraconnection pad formed on the surface of the second layer of the tile display module in a shadow area between pixels, connected to at least one electrical interconnection means on the second layer;

b) conductive means for connecting the conductive substance on the surface of the first layer and the ground intraconnection pad when the first and second layers are in alignment.

18. The large flat panel display of claim 17 in which the conductive means is a conductive adhesive.

19. The large flat panel display of claim 17 in which the transparent conductive substance is Indium Tin Oxide.

20. The large flat panel display of claim 5 which each of the tile display modules further comprises a ledge formed on the edge of at least one layer of the tile display module, between the layers thereof.

21. The large flat panel display of claim 20 in which the ledge is formed by extending one edge of one of the layers beyond the edge of the facing layer.

22. The large flat panel display of claim 20 in which the ledge is inset into one of the two layers, the edges of the two layers being coterminous.

23. The large flat panel display of claim 20 in which the tile display module further comprises connector means located within the ledge for electrical connection to the electrical interconnection means of the tile display module.

24. The large flat panel display of claim 23 in which each of the tile display modules further comprises lead frame type connections, having a first end connected to the connector means located in the ledge, and a second end connected to the pads of the tile display module.

25. The large flat panel display of claim 24 in which the lead frame type connections are tape automated bonding connections.

26. The large flat panel display of claim 24 in which the lead frame type connections are metal applied on the edge of the tile display module.

27. The large flat panel display of claim 24 in which the lead frame type connections are wire bonds.

28. The large flat panel display of claim 24 in which the lead frame type connections are metal foil.

29. The large flat panel display of claim 24, in which the tile display module further comprises lead frame type connections located in the dark space between tile display modules, and arranged such that the interpixel spacing between two
   pixels on two adjacent tile display modules maintains the uniform periodicity of the interpixel spacing between adjacent pixels within the tile display modules, the lead frame connections having a first end connected to the electrical interconnection means of the tile display module and a second end connected to the pad of the tile display module, and the first end of the lead frame type connections has a plurality of nodules for enhancing contact between the lead frame and the electrical interconnection means.

30. The large flat panel display of claim 29 in which the nodules are nickel and gold.

31. The large flat panel display of claim 24, in which the tile display module further comprises lead frame type connections located in the dark space between tile display modules, and arranged such that the interpixel spacing between two adjacent pixels on two adjacent tile display modules maintains the uniform periodicity of the interpixel spacing between adjacent pixels within the tile display modules, the lead frame connections having a first end connected to the electrical interconnection means of the tile display module and a second end connected to the pads of the tile display module, and the first end of the lead frame type connections has a plurality of dendrites for enhancing contact between the lead frame and the electrical interconnection means.

32. The large flat panel display of claim 1 in which the pixels of the tile display modules are addressed using a matrix of row and column interconnection lines, with each pixel being located at the intersection of at least one row and one column interconnection line, such that an individual pixel is addressed through activation of the row interconnection line and the column interconnection line intersecting at said pixel.

33. The large flat panel display of claim 1 in which the tile display modules comprise a display tile comprising a plurality of pixel means, mounted on a tile carrier.

34. The large flat panel display of claim 33 in which the electrical interconnection means of the tile display module is located on the tile carrier.

35. The large flat panel display of claim 34 in which the display tiles further comprise shadow areas between the pixels, and the electrical interconnection means is located in the shadow areas such that the electrical interconnection means does not block light transmitted by the pixels.

36. The large flat panel display of claim 33 in which the electrical interconnection means of the tile display module is located on the display tile.

37. The large flat panel display of claim 36 in which the electrical interconnection means of the tile display module comprise high-conductivity metal traces deposited on at least one surface of the tile display module.

38. The large flat panel display of claim 36 in which the display tile further comprises shadow areas between the pixels, and the electrical interconnection means is located in the shadow areas such that the electrical interconnection means does not block light transmitted by the pixels.

39. The large flat panel display of claim 38 in which the electrical interconnection means of the tile display module comprises lines which are as wide as possible, such that electrical delay is minimized.

40. The large flat panel display of claim 1 in which a plurality of layers of electrical interconnection means is applied to the back plate.

41. The large flat panel display of claim 40 in which the electrical interconnection means on the back plate comprise high conductivity metal traces deposited on at least one surface of the back plate.

42. The large flat panel display of claim 40 in which the tile display modules further comprise shadow areas between the pixels, and the electrical interconnection means is located in the shadow areas such that the electrical interconnection means do not block light transmitted by the pixels.

43. The large flat panel display of claim 42 in which the electrical interconnection means of the tile display module comprises lines which are as wide as possible, such that electrical delay is minimized.

44. The large flat panel display of claim 1 further comprising flowable alignment elements for connecting the pads of the tile display modules and the corresponding pads of the back plate, such that each of the tile display modules is both connected to the back plate and aligned relative to the other tile display modules by the action of the flowable alignment elements.

45. The large flat panel display of claim 44 in which the flowable alignment elements comprises solder joints which are liquefied and then solidify and draw the tile display module into alignment.

46. The large flat panel display of claim 45 in which the solder joints are made sufficiently small to fracture under tensional stress, such that the tile display module may be removed by lifting it outward relative to the back plate, fracturing the solder joints.

47. The large flat panel display of claim 1 further comprising a conductive adhesive for connecting the pads of the tile display modules and the corresponding pads of the back plate, such that each of the tile display modules is connected to the back plate physically and electrically by the conductive adhesive.

48. The large flat panel display of claims 47 in which the conductive adhesive connecting the pad of the tile display modules and the pad of the back plate is mechanically removable.

49. The large flat panel display of claim 1 further comprising a cover plate located over the tile display modules, covering the outer surface thereof.

50. The large flat panel display of claim 49 in which the cover plate is sealed to the back plate such that the tile display modules are contained within a sealed area comprising the gap between the cover plate and the back plate.

51. The large flat panel display of claim 50, further comprising a humidity control substance in the sealed area.

52. A large flat panel display comprising:
   a) a plurality of tile display modules, each tile display module comprising:
      i) a plurality of pixels arranged in a matrix having uniformly periodic interpixel spacing said pixels comprising an active area and an inactive, dark area,
      ii) electrical interconnection means for addressing the pixels such that each pixel may be selectively controlled through the electrical interconnection means, and
      iii) edge connection on at least one edge of the tile display module, connected to the electrical interconnection means;
   b) a back plate for supporting the tile display modules, the tile display modules being mounted upon the back plate, located such that the interpixel spacing between two adjacent pixels on two adjacent tile display modules maintains the uniform periodicity of the interpixel spacing between adjacent pixels within the tile display modules, and such that the edge connection of each tile display module is located around the periphery of the display formed by the plurality of tile display modules;

c) driver means for driving the display modules, having connection means connected to the edge connection of the tile display modules such that the pixels of the tile display modules are operatively driven by the driver means; and d) masking means disposed proximate said back plate, said shadow mask means preventing light entering said back plate from exiting in said dark areas of said pixels;

the pixels of the large flat panel display being addressed as if the large flat panel display comprising a plurality of tile display modules were a single monolithic large display.

53. The large flat panel display of claim 52, in which the tile display modules are mounted on the back plate using reworkable adhesive.

54. The large flat panel display of claim 52, in which:

the tile display modules further comprise a plurality of pads on the rear surface of the tile display modules;

the back plate further comprises a plurality of pads on the surface on which the tile display modules are mounted, located to match the pads on the rear surface of the tile display modules;

the flat panel display further comprises flowable passive alignment elements between the pads on the rear surface of the tile display modules and the pads on the back plate;

such that each of the tile display modules is both connected to the back plate and aligned relative to the other tile display modules by the flowable passive alignment elements.

55. The large flat panel display of claim 54 in which the flowable alignment elements comprise solder joints which are liquefied and then solidify and draw the display tile module into alignment.

56. The large flat panel display of claim 55 in which the solder joints are made sufficiently small to fracture under tensional stress, such that the tile display module may be removed by lifting it outward relative to the back plate, fracturing the solder joints.

57. A liquid crystal display module for use in tiled flat panel displays, comprising:

a) a first and a second plate, located in alignment, one below the other;

b) adhesive sealing means located between the first and second plates around the periphery of at least one of said plates, adhesively joining the first and second plates together and creating a volume therebetween, a gap being left in the adhesive sealing means forming an orifice, and the display module further comprising a notch in an edge thereof, aligned with the orifice;

c) liquid crystal material located in the volume between the first and second plates, the liquid crystal material being introduced between the first and second layers by evacuating the area between the first and second areas, introducing the liquid crystal through the orifice, then sealing the orifice, such that the seal in the orifice fits in the notch in the edge of the display module and does not extend beyond the edge;

d) a plurality of light valves arranged across the second plate with dark, shadow areas between the light valves, each light valve having a control input for controlling the light flow through the light valve, the control inputs being addressed through a matrix of row and column control lines, the spacing between light valves being uniformly periodic across the liquid crystal display module, the control lines being arranged in the dark, shadow areas between the light valves and forming a mask therein, said connecting lines connecting the plurality of light valves to the periphery of the liquid crystal display module, the width of the seal means being less than half the spacing between light valves; and e) edge interconnection means for connecting the display module to a flat panel display, the edge interconnection means being located at the periphery of the display module, and connected to the control lines; the adhesive seal means and the edge interconnection means being arranged such that when two modules are aligned in proximity to each other, the spacing between adjoining light valves on the two modules maintains a uniform periodicity with the spacing between light valves within the display module.

58. The liquid crystal display module of claim 57, in which the orifice is located in a position aligned with a shadow area between light valves.

59. The liquid crystal display module of claim 57, in which the sealing means is applied using a fine line dispensing needle.

60. The liquid crystal display module of claim 57, in which the edge interconnection means comprises pads located on the side of the second plate opposite the side to which the first plate is attached.

61. The liquid crystal display module of claim 60, in which the display module further comprises lead frame type connections having a first end connected to the control lines and a second end connected to the pad means, and the first end of the lead frame type connections has a plurality of nodules for enhancing contact between the lead frame and the control lines.

62. The liquid crystal display module of claim 61 in which the nodules are selected from the group consisting of palladium, nickel and gold.

63. The liquid crystal display module of claim 57 in which the adhesive is a conductive adhesive having conductive elements for connection to the control lines.

64. The liquid crystal display module of claim 57 in which the display module further comprises a ledge formed on the edge of at least one of the plates.

65. The liquid crystal display module of claim 64 in which the ledge is formed by extending one edge of one of the plates beyond the edge of the facing plate.

66. The liquid crystal display module of claim 64 in which the ledge is inset into one of the two plates, the edges of the two plates being coterminous.

67. The liquid crystal display module of claim 64 in which the display module further comprises connector means located within the ledge for electrical connection to the control lines.

68. The liquid crystal display module of claim 67 in which the display module further comprises lead frame type connections, having a first end connected to the connector means located in the ledge, and a second end connected to the edge connection means.

69. The display module of claim 68 in which the lead frame type connections are tape automated bonding connections.

70. The liquid crystal display module of claim 57 in which the edge interconnection means comprises means to wrap around from the first plate to the second plate, all within the shadow area.

71. The liquid crystal display module of claim 57 in which the edge interconnection means comprises a via filled with conductive material.

72. The liquid crystal display module of claim 57 in which the edge interconnection means comprises a metal trace applied to the edge of the liquid crystal display module.

73. The liquid crystal display module of claim 57 in which the first plate of the liquid crystal display module is coated on the side facing the second plate with a transparent conductive substance, and the liquid crystal display module further comprises:

f) at least one ground intraconnection pad formed on the surface of the second layer of the tile display module in a shadow area between light valves, connected to at least one electrical interconnection means on the second layer;

g) conductive means for connecting the conductive substance on the surface of the first layer and the ground intraconnection pad when the first and second layers are in alignment.

74. The liquid crystal display of claim 73 in which the conductive means is a conductive adhesive.

75. The liquid crystal display module of claim 73 in which the conductive means is a non-conductive spacer covered in conductive material.

76. The liquid crystal display module of claim 73 in which the transparent conductive substance is Indium Tin Oxide.

* * * * *